No. 718,997. PATENTED JAN. 27, 1903.
J. FRIEND & W. W. PRICE.
MACHINE FOR MAKING CANDY.
APPLICATION FILED MAY 12, 1902.
NO MODEL. 3 SHEETS—SHEET 1.
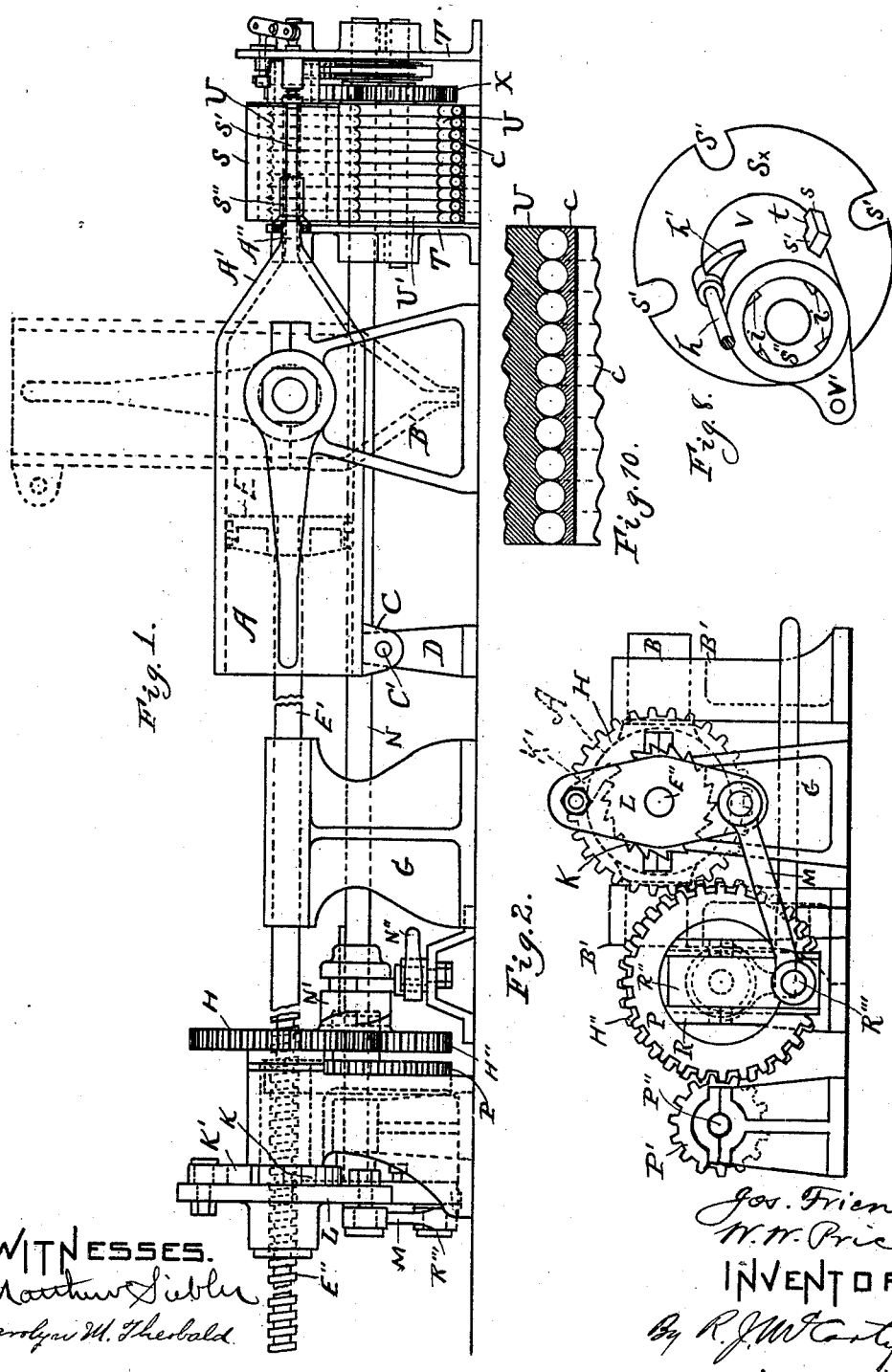

No. 718,997. PATENTED JAN. 27, 1903.
J. FRIEND & W. W. PRICE.
MACHINE FOR MAKING CANDY.
APPLICATION FILED MAY 12, 1902.
NO MODEL. 3 SHEETS—SHEET 2.
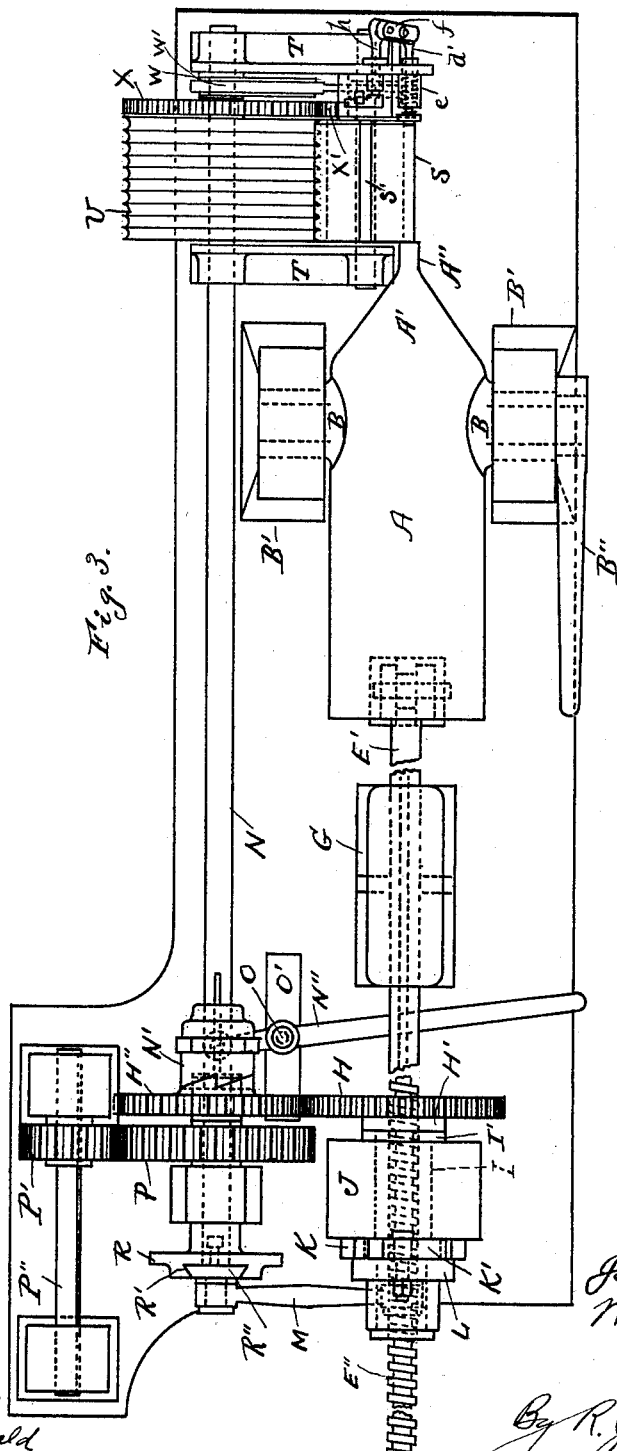

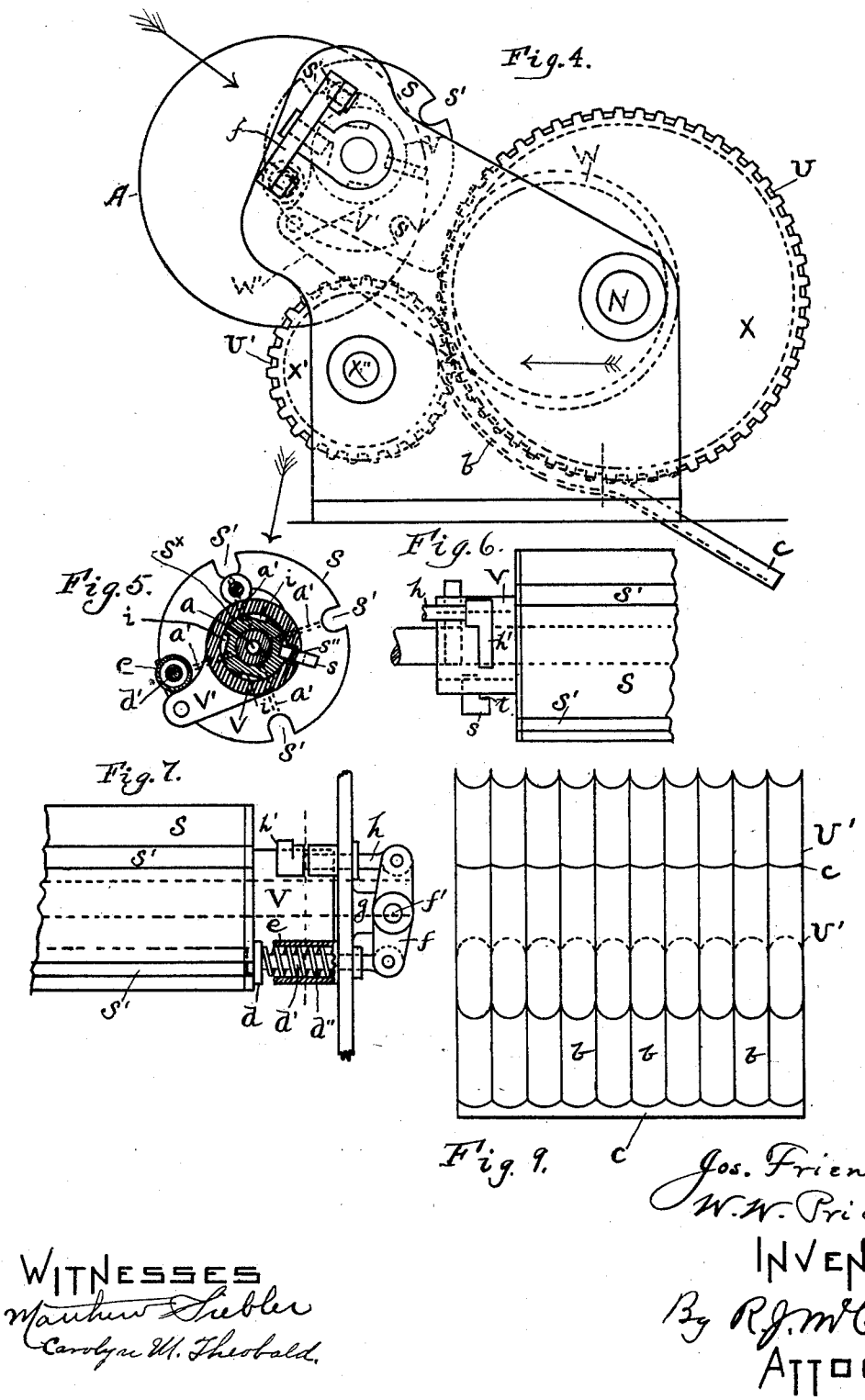

UNITED STATES PATENT OFFICE.

JOSEPH FRIEND AND WILLIAM W. PRICE, OF DAYTON, OHIO.

MACHINE FOR MAKING CANDY.

SPECIFICATION forming part of Letters Patent No. 718,997, dated January 27, 1903.

Application filed May 12, 1902. Serial No. 106,950. (No model.)

*To all whom it may concern:*

Be it known that we, JOSEPH FRIEND and WILLIAM W. PRICE, citizens of the United States, residing at Dayton, in the county of Montgomery and State of Ohio, have invented certain new and useful Improvements in Machines for Making Candy; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to candy-machines, and has for its object the provision of means for manufacturing candy in the form of balls or spheres.

The invention comprises the structural features hereinafter described and claimed.

In a detail description of the invention reference is first made to the accompanying drawings, of which—

Figure 1 is a side elevation. Fig. 2 is an end elevation. Fig. 3 is a top plan view. Fig. 4 is an elevation of the end opposite to that shown in Fig. 2. Figs. 5, 6, 7, 8 are detail views of the grooved drum to which the candy is delivered from the cylinder. Figs. 9 and 10 are detail views of the grooved cutters and formers to which the candy is delivered from the drum and in which said candy is cut into particles and subsequently formed into balls.

In a detail description of the invention similar reference characters indicate corresponding parts.

A designates a cylinder into which the fondant is placed in a plastic condition. This cylinder has its discharge end terminating in a conical shape A' and a nozzle A''. The said cylinder also has projected from opposite sides trunnions B, which are mounted in supporting-frames B'. One of said trunnions has fixed to it a lever B'', by means of which the cylinder is turned to an upright position, as shown in dotted lines in Fig. 1, and in which position the said cylinder receives the fondant.

C designates an apertured projection on the lower front end of said cylinder, and D is an apertured standard to which said lug is secured by means of a pin C', which passes through said apertures. The open end of the cylinder is supported in a proper horizontal position by means of these lugs or projections C and D and the pin C'.

E designates a piston within said cylinder and connected to a piston-rod E', said piston-rod passing through a suitable standard G, in which it has a bearing. The end of said piston-rod terminates in a screw E''.

H is a spur-wheel inclosing the screw-threaded portion E'' of the piston-rod E' and adapted to drive the piston in one direction, as hereinafter specified. H' is a hub projecting from one side of said spur-wheel and to which is connected a sleeve I (shown in dotted lines in Fig. 3) and having its bearing in a box J. The sleeve I is connected to the hub H' of the spur-wheel by means of a flange I'. The said sleeve has its interior surface provided with screw-threads, which engage with the screw E''.

K is a ratchet-wheel which is fixed to said sleeve I and is actuated by a ratchet-pawl K'. The ratchet-pawl K' is carried on a rocker-arm L, which is loose upon the sleeve I. These ratchet devices drive the piston in an opposite direction to that in which it is driven by the spur-wheel H.

M is a connecting-rod which is pivotally attached to the lower end of said rocker-arm L and through which movement is imparted to said arm and to the piston-rod E' to drive the piston inwardly, to compress the fondant within the cylinder A, and to cause said fondant to discharge through the nozzle A'' in rope-like form.

N is a counter-shaft having a clutch N', which is thrown in and out through a clutch-lever N'', said clutch-lever having its fulcrum at O on a standard O'.

H'' is a spur-wheel which is loose on shaft N and carries one member of the clutch N'. The other member of said clutch is splined on the shaft N, consequently has a continuous rotary movement with said shaft. When the clutch is thrown in, as shown in Fig. 3, motion is transmitted to the spur-wheel H through the spur-wheel H'' and to the piston E through the sleeve I and screw E''.

P designates a spur-wheel which is fixed to the shaft N and which is driven from a smaller initial spur-wheel P' on the shaft P'', the said shaft P'' being driven from a belt and pulley. (Not shown.)

R designates an oblong plate which is rigidly mounted on the end of the shaft N and which has a dovetail groove on its outer face that receives a plate R'', which has a dovetail connection therewith by means of the groove R'. The shaft N, as before stated, is connected to the rocker-arm L, has a connection with this plate R'', so that a crank motion is transmitted through said connecting-rod to the said rocker-arm.

The throw of the connecting-rod M is varied according to the position of the plate R'' on the plate R. The connection between said rod M and said plate R'' is made by means of a wrist-pin R''' projecting from said plate.

From the foregoing description it will be seen that when the clutch devices N' are in gear the screw-shaft E'' is driven by means of the gear H and the sleeve I. During this period in which the screw-shaft is rotated the ratchet-pawl K' is held out of the teeth of the ratchet-wheel K. The movement thus imparted to the screw-shaft is that which withdraws the piston E from the cylinder after the compression of the fondant. The inward or compressing movement of said piston is accomplished through the ratchet-wheel K and pawl K' and is necessarily a slower movement than that which withdraws the piston from the cylinder.

S is a drum to which the candy is discharged from the nozzle A'' of the cylinder and which has four longitudinal grooves S' in the periphery thereof on the four opposite sides. The said drum is rotated in a manner hereinafter described to bring each groove S' in line with the discharge-nozzle A'' of said cylinder, and as the fondant is forced through said nozzle it enters each groove in a rope-like form. The outer side of each groove S' is inclosed as said grooves come in position by a stationary plate S'', so that the fondant as it enters each groove is maintained therein by the said outward inclosure. The plate S'' is stationary, having a suitable connection at each end with the uprights or frames T. The frames T consist of two plates between which the drum S is rotatably mounted, as well as other mechanisms presently described.

U and U' designate two grooved cutters and formers, one of which is of a smaller diameter than the other—namely, the rearward or lower cutter U', as shown in Fig. 4—and receives the ropes of candy from the drum S to be cut into pieces and made into balls. The larger cutter and former U is keyed to the counter-shaft N. The smaller cutter and former is on its own shaft X'' and is driven at a ratio of two to one from said shaft N through spur-wheels X and X'. (See Fig. 3.)

The grooved cutter and former U' is mounted below the drum S, (see Fig. 4,) and as each groove S' in said drum arrives in the lower position the stick or rope of candy or fondant previously placed therein is moved out of said groove by water-pressure exerted against it through channel $a$. The main water-channel $a$ is through the axis of the drum and is fed through any suitable pipe connection. Communicating with said main channel is a series of by-passages $a'$. (Shown in dotted lines in Fig. 5.) These by-passages $a'$ lead to the grooves S' in suitable number. As each stick of fondant is delivered to the smaller cutter U' it is engaged by the meeting or cutting edges of the two cutters U U' and is severed into pieces of uniform size. After thus being severed into small pieces or particles said particles enter a series of semicircular channels $b$ in a trough $c$. The channels $b$ inclose the lower sides of the annular grooves in the larger cutter and former U and complete a series of circular inclosures or passages, as shown in Fig. 10. Through these circular passages the pieces of fondant are rolled to a round or spherical form and are discharged from the machine at the end of the trough $c$. (See Fig. 4.)

The drum S is given an intermittent rotary movement to present each groove S' in proper position to receive a charge of fondant from the nozzle A'' through the following mechanism: $d$ designates a plate, which forms the outer end inclosure of the grooves S' as each of said grooves is moved to a position to receive the fondant. This plate is connected to a rod or plunger $d'$, inclosed within a casing $d''$ and surrounded by a spring $e$, the tension of which spring maintains said plate $d$ in contact with the end of the drum, as shown in Fig. 7. The rod or plunger $d'$ is connected to a rocker-arm $f$, which is fulcrumed at $f'$ to a bearing $g$. Connected to the other end of said rocker-arm $f$ is a rod or plunger $h$, which receives a longitudinal reciprocating movement through the rocker-arm. The rod $h$ has fixed to it a shoe $h'$, which is adjacent to a sleeve V.

The sleeve V incloses the hub $S^\times$ of the drum S. The said hub $S^\times$, as shown in Fig. 8, has four notches $i$ in its surface at opposite points, which are engaged by a dog $s$ at predetermined times to cause a rotation of said drum S. The dog $s$ is loosely mounted in an opening $s'$ in the sleeve V and is pressed inwardly by a spring $s''$. The said dog has a shoulder $t$, which at certain times is brought in contact with the upper side of the shoe $h'$ and is thus prevented from entering the notches $i$ in the hub $S^\times$. The crank projection V' of the sleeve V is moved by an eccentric W through eccentric-strap W'. (Shown in dotted lines in Fig. 4.) The eccentric W is moved by the counter-shaft N.

The operation of our improved machine is as follows: The cylinder A having been moved to the vertical position, as shown in Fig. 1, is loaded with a sufficient quantity of the candy or fondant and is then lowered and fixed in the horizontal position shown in Fig. 1. The clutch devices N' are disconnected, and the piston E is driven inwardly through the ratchet devices K and K', which are operated in the manner hereinbefore specified. As soon as a certain amount of pressure is exerted against the fondant it is forced out of the spout A'' in a rope-like form, one of the channels or grooves S' in the drum S being in a position to receive said material. When the rope or stick of fondant is fed entirely into said channel or groove S', the end of said stick comes in contact with the inclosing plate d, forcing said plate outwardly and causing the rocker-arm f to move on its fulcrum and to drive in the rod h and move the shoe h' out of the path of the dog s. In the meantime the sleeve V is receiving an intermittent rotary movement on the hub $S^\times$ of said drum, said movement being through the eccentric W. In this movement the said dog engages in a notch i in the hub $S^\times$, and a quarter-turn of the drum S is obtained, which moves the grooves or channels S', which have previously been filled with fondant, to the lower position and brings the next adjacent groove or channel S' in position to receive another charge of fondant.

It will be borne in mind that the shoe h' has a horizontal reciprocating movement and is movable in the path of the shoulder t of the dog s to prevent said dog from entering the notch i at such times when it is not proper to rotate the drum S. The shoe h' is in this position while each of the grooves S' is being filled with fondant. The fondant, as before stated, is delivered from the grooves S' by water-pressure and drops across the face of the smaller cutter U' and is cut up into particles, as before stated, and rolled into balls and delivered from the trough.

Having described our invention, we claim—

1. In a candy-machine, a cylinder from which the fondant is forced in rope-like form, means for thus forcing said fondant, a drum having longitudinal grooves therein into which the fondant is delivered from said cylinder, rotating cutters and formers to one of which the fondant is delivered from the drum in rope-like form, said cutters and formers being adapted to sever said ropes of fondant into pieces, a trough coöperating with one of said cutters and formers to form said pieces into balls, means for imparting intermittent rotating movement to said drum, and means for imparting continuous rotary movement to said cutters and formers.

2. In a candy-machine, a cylinder from which, fondant is discharged in rope-like form, a piston within said cylinder, means for imparting reverse movements to said piston, a drum having grooves in the periphery thereof into which the fondant is discharged from said cylinder, a cutter and former below said drum to receive the sticks of fondant therefrom, another cutter and former coöperating with said first-named cutter and former to sever said sticks of fondant into small pieces, said cutters and formers combining to initially form said pieces into balls, and a channeled trough further coöperating with said cutters and formers to complete the formation of said balls.

3. In a candy-machine, a cylinder from which, fondant is delivered in rope-like form, a piston within said cylinder, means for imparting reverse movement to said piston, a drum having a series of grooves into which the fondant is fed from said cylinder, means for imparting intermittent rotary movement to said drum to bring the grooves therein into position to receive the fondant, means for removing the fondant from the grooves in said drum, a rotary cutter and former below said drum adapted to receive the sticks of fondant from said drum, another rotary cutter and former coöperating with said first-named cutter and former to cut said sticks of fondant into pieces and to initially form said pieces into balls, and a channeled trough coöperating with one of said cutters and formers to complete the formation of said balls.

4. In a candy-machine, the combination with a cylinder from which, fondant is fed in rope-like form, of a grooved drum which receives the fondant in such condition, grooved cutters and formers which cut the fondant into pieces and form said pieces into balls, a sleeve mounted on a hub projecting from the grooved drum, means for imparting a rocking motion to said sleeve, ratchet devices carried on said sleeve and said hub for imparting a rotation of said drum step by step, and means controlling the connections of said ratchet devices, substantially as set forth.

In testimony whereof we affix our signatures in presence of two witnesses.

JOSEPH FRIEND.
WILLIAM W. PRICE.

Witnesses:
R. J. McCARTY,
W. B. NEVIN.